F. NEWBAUER.
GRAIN SHOCKING DEVICE.
APPLICATION FILED JULY 9, 1913.
1,124,236.
Patented Jan. 5, 1915.
8 SHEETS—SHEET 2.
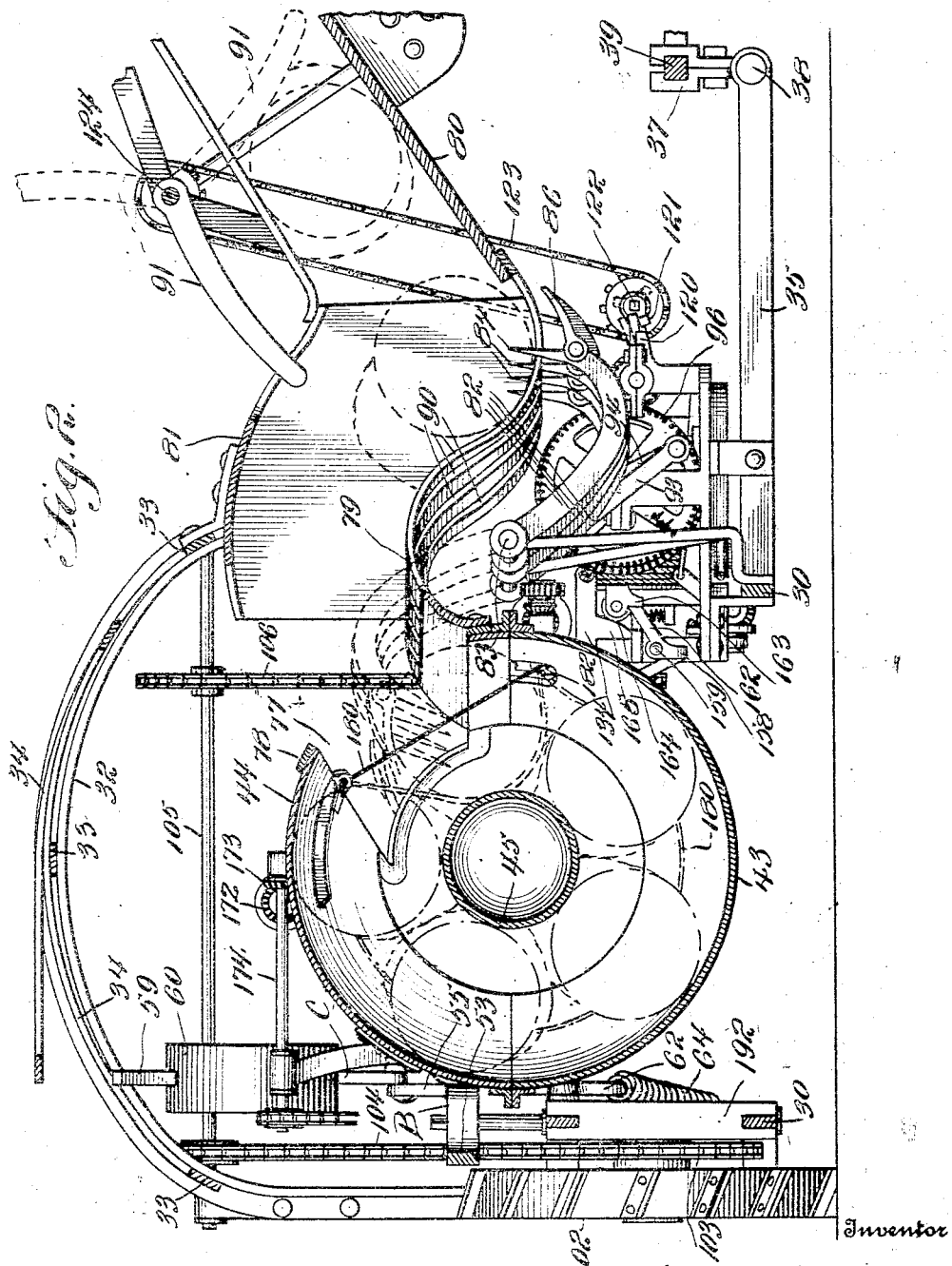

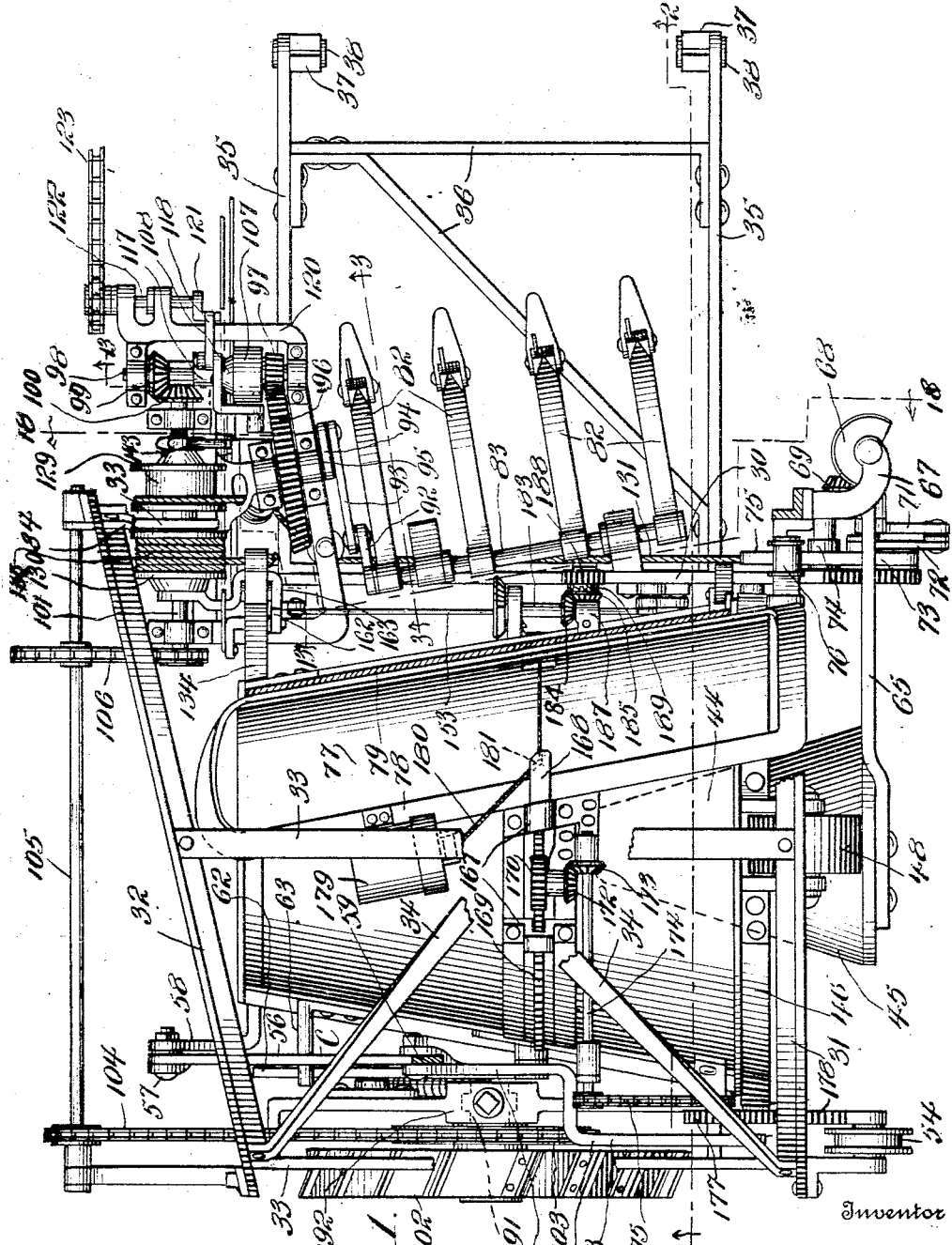

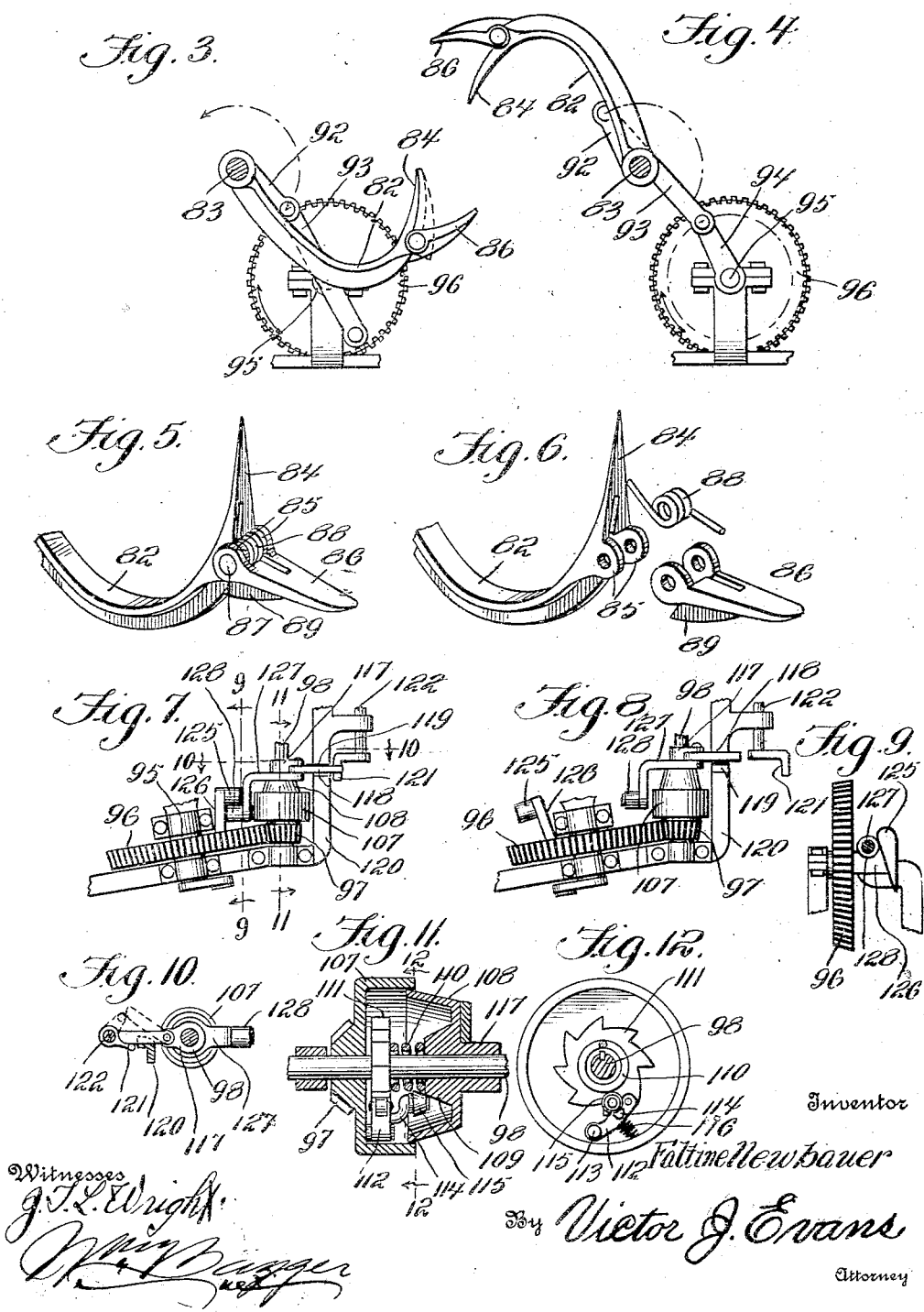

F. NEWBAUER.
GRAIN SHOCKING DEVICE.
APPLICATION FILED JULY 9, 1913.
1,124,236.
Patented Jan. 5, 1915.
8 SHEETS—SHEET 4.
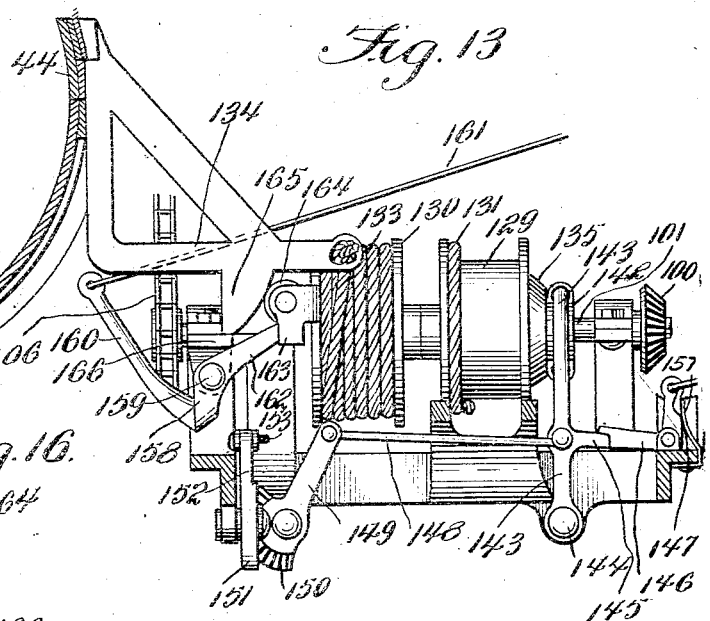
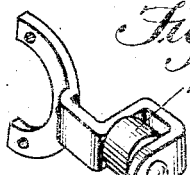
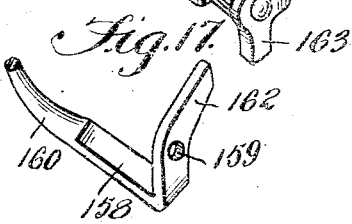
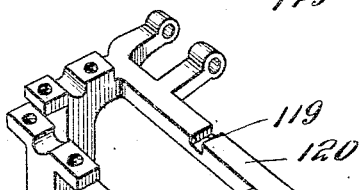
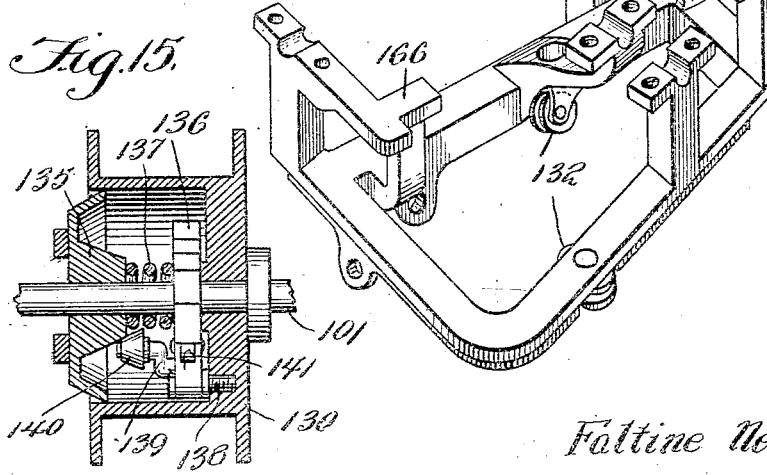
Inventor
Faltine Newbauer
By Victor J. Evans
Attorney
Witnesses

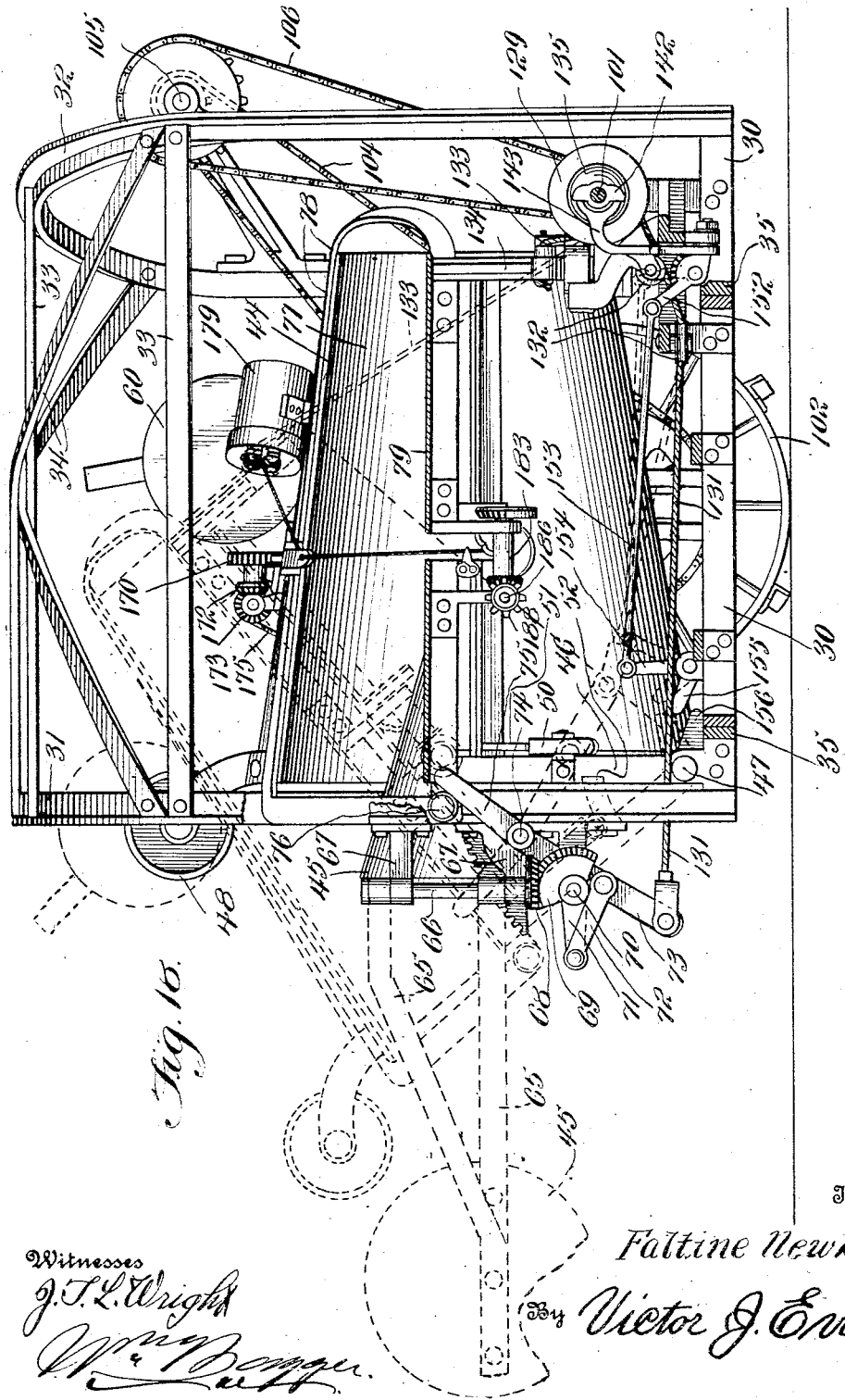

F. NEWBAUER.
GRAIN SHOCKING DEVICE.
APPLICATION FILED JULY 9, 1913.
1,124,236.
Patented Jan. 5, 1915.
8 SHEETS—SHEET 6.
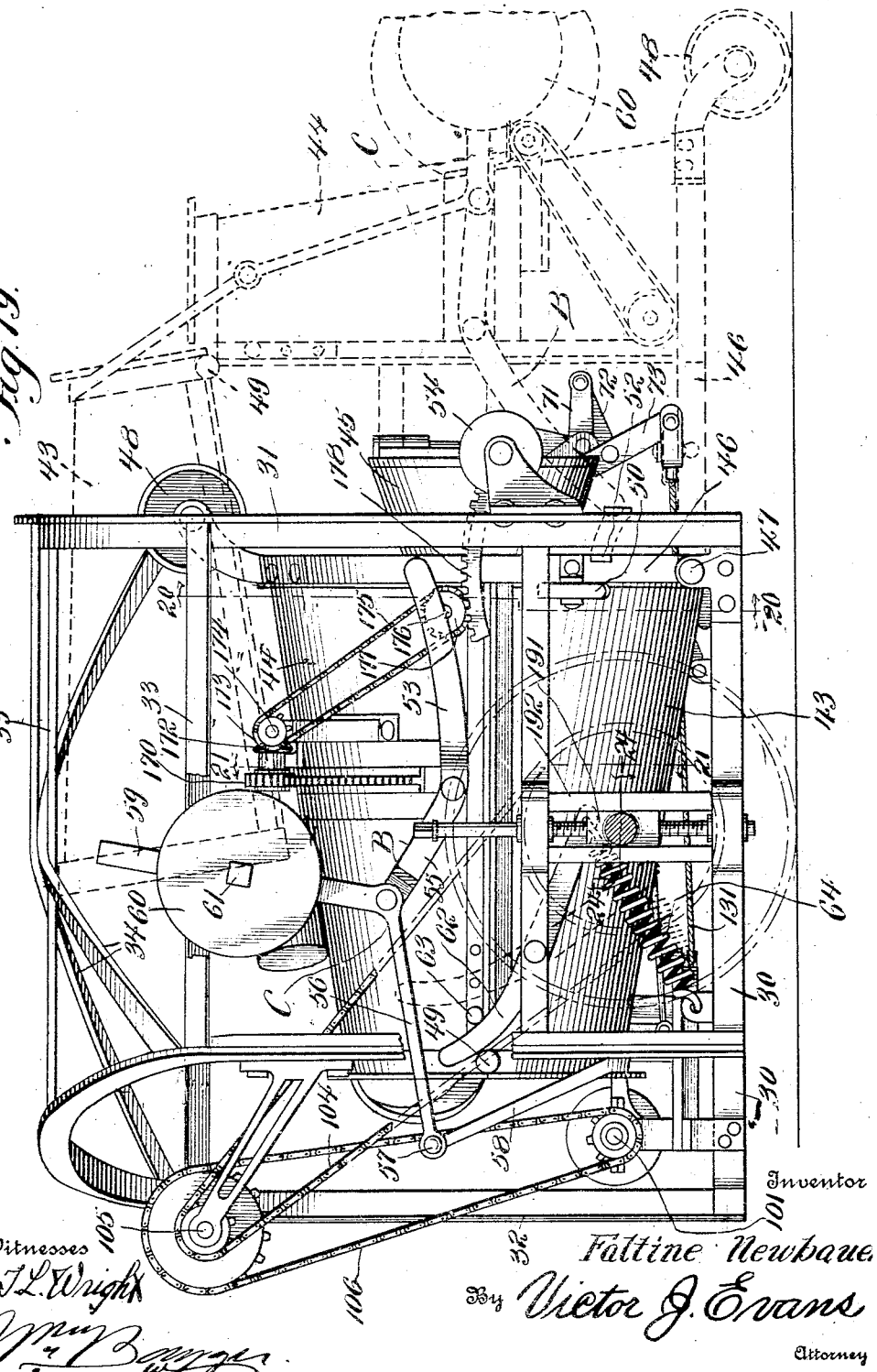

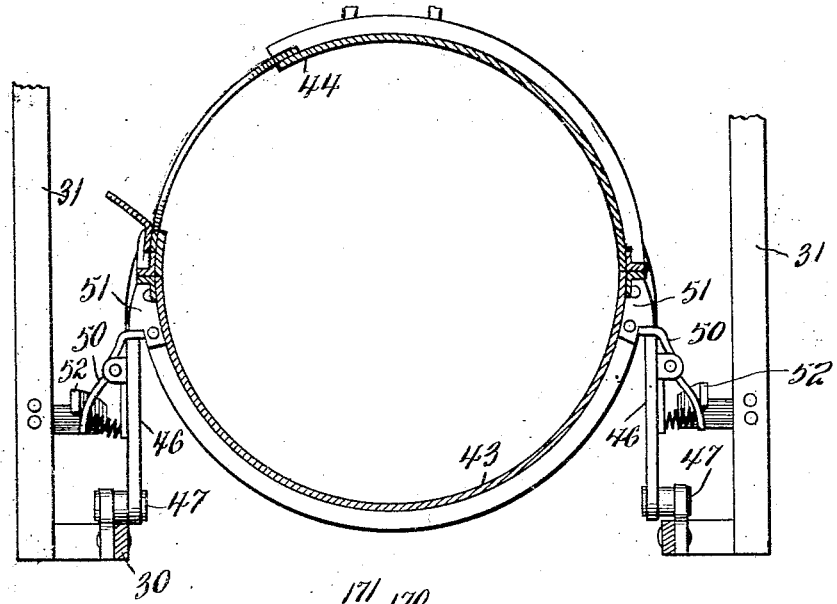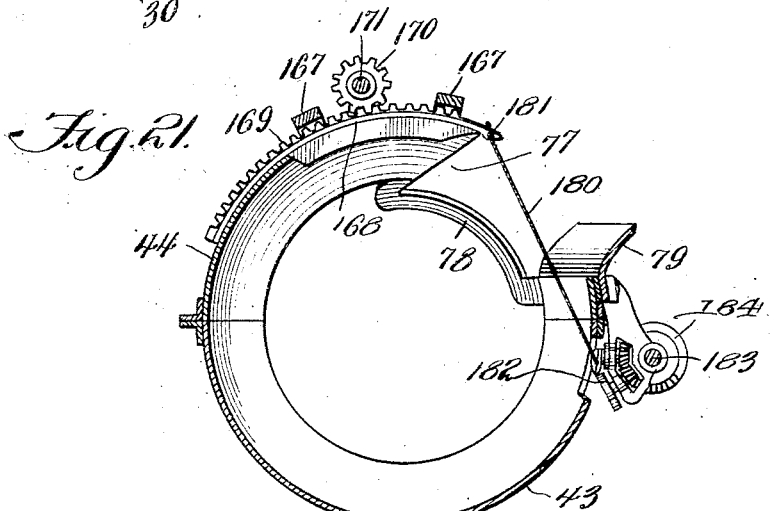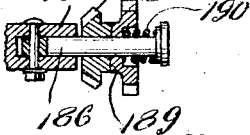

F. NEWBAUER.
GRAIN SHOCKING DEVICE.
APPLICATION FILED JULY 9, 1913.
1,124,236.
Patented Jan. 5, 1915.
8 SHEETS—SHEET 8.
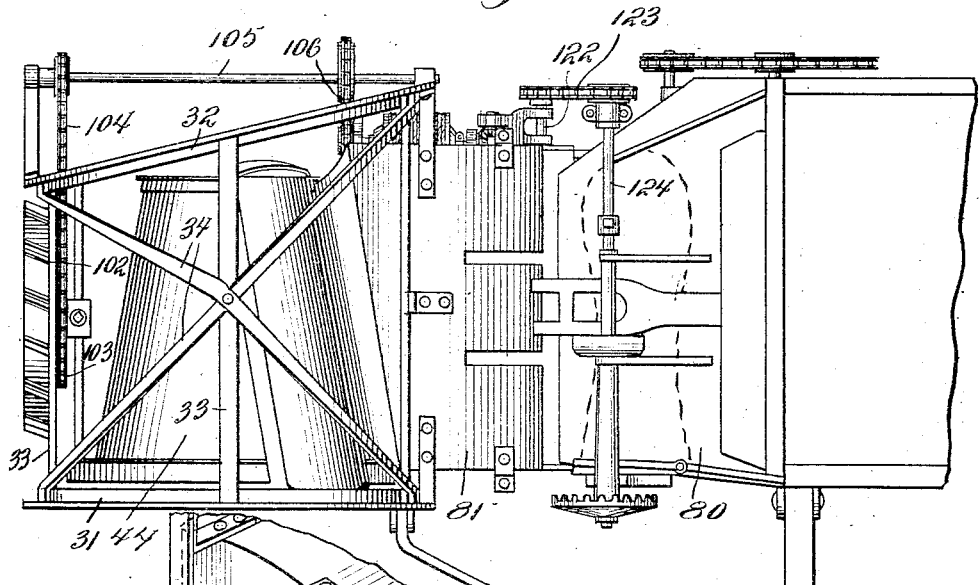
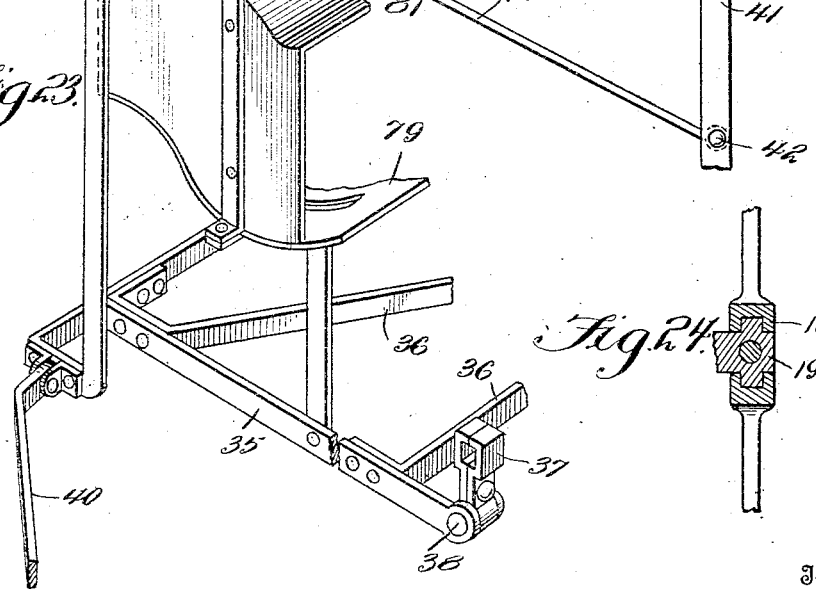
Witnesses
Inventor
Faltine Newbauer
By Victor J. Evans.
Attorney

UNITED STATES PATENT OFFICE.

FALTINE NEWBAUER, OF VALLEY CITY, NORTH DAKOTA, ASSIGNOR OF ONE-HALF TO JULIUS J. ENGEN, OF VALLEY CITY, NORTH DAKOTA.

GRAIN-SHOCKING DEVICE.

1,124,236.  Specification of Letters Patent.  Patented Jan. 5, 1915.

Application filed July 9, 1913. Serial No. 778,142.

*To all whom it may concern:*

Be it known that I, FALTINE NEWBAUER, a citizen of the United States, residing at Valley City, in the county of Barnes and State of North Dakota, have invented new and useful Iprovements in Grain-Shocking Devices, of which the following is a specification.

This invention relates to grain shocking devices, and it has for its object to produce a simple and efficient device of this class which may be conveniently attached to and used in connection with any modern and conventional type of grain binder for the purpose of receiving the bundles, forming the same into a shock, tying the shock and depositing the shock upon the ground without obstructing the operation of the harvester and binder.

Further and special objects of the invention are to simplify and improve the construction of the shock forming device; to simplify and improve the means for transferring the bundles from the binder to the shock former; to provide simple and improved means for tilting the shock former to a discharging position; for releasing the shock, and for restoring the shock former to its initial or receiving position; and incidentally to provide mechanism for tying the shock so as to positively prevent the sheaves forming said shock from dropping flat upon the ground.

A still further object of the invention is to provide shock forming means including a movably supported core member whereby the butts of the sheaves will be spread outward to form a broad base for the shock and also to form a ventilating space within the shock whereby the drying and curing of the grain will be promoted.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a grain shocker constructed in accordance with the invention, showing the shock former in bundle receiving position, some parts having been broken away in order to expose subjacent parts. Fig. 2 is a vertical sectional view taken on the line 2—2 in Fig. 1. Fig. 3 is a sectional detail view taken on the line 3—3 in Fig. 1, and showing one of the packer arms and related parts. Fig. 4 is a view similar to Fig. 3, but showing the packer arm in a different position. Fig. 5 is a perspective detail view of a portion of one of the packer arms detached. Fig. 6 is a perspective detail view, showing the parts of the packer arm disassembled. Fig. 7 is a detail plan view showing a portion of the packer actuating mechanism. Fig. 8 is a view similar to Fig. 7, but showing the parts in a different position. Fig. 9 is a sectional detail view taken on the line 9—9 in Fig. 7. Fig. 10 is a sectional detail view taken on the line 10—10 in Fig. 7. Fig. 11 is a sectional detail view taken on the line 11—11 in Fig. 7. Fig. 12 is a sectional detail view taken on the line 12—12 in Fig. 11. Fig. 13 is a sectional detail view taken on the line 13—13 in Figs. 1, to illustrate the drums which are utilized to actuate the means for tilting the shock former to a discharging position and for restoring it to a receiving position, and related parts. Fig. 14 is a perspective detail view of the frame structure used to support the shaft carrying the drums shown in Fig. 13 and other coöperating parts. Fig. 15 is a sectional detail view of one of the drums and the clutch mechanism associated therewith. Figs. 16 and 17 are perspective detail views of parts of the tripping mechanism. Fig. 18 is a sectional detail view on the line 18—18 in Fig. 1. Fig. 19 is a side elevation of the shocker with the ground wheel removed, the axle being shown in sec tion. Fig. 20 is a transverse sectional view taken on the line 20—20 in Fig. 19. Fig. 21 is a sectional detail view taken on the line 21—21 in Fig. 19. Fig. 22 is a sectional detail view taken longitudinally through the knotter actuating shaft. Fig. 23 is a perspective detail view of a portion of the shocker frame. Fig. 24 is a sectional detail view taken on the line 24—24 in Fig. 19 to show the adjustable slide carrying the ground wheel. Fig. 25 is a diagrammatic plan view showing the shocker attached to and connected with a grain binder.

Corresponding parts in the several figures are denoted by like characters of reference.

The frame of the improved grain shocker includes side members 30 which are connected together by front and rear arch members 31, 32, the latter being obliquely disposed, as shown, and said arch members being connected together by longitudinal brace bars 33 and by diagonal top bars 34, said frame structure being preferably made up of structural angle or channel bars in order to provide the requisite strength, rigidity and lightness. The main frame structure is provided with arms or brackets 35 extending laterally from one of the side members 30, said brackets being securely connected together by braces 36, and said brackets being provided with terminal clamp members 37 connected therewith by pivot members 38 and serving for the purpose of attaching the shocker frame to and connecting it with the frame of the grain binder in connection with which it is to be used and a portion of which engaged by the said clamp is shown at 39, see Fig. 2. A diagonal brace member 40 is pivotally connected with the front of the shocker frame and extends thence to the tongue 41 of the grain binder with which it is suitably connected by a pivot member 42, see Fig. 25. The shocking device may thus be easily and quickly connected with or disconnected from the frame of the binder; it is capable of adapting itself to uneven ground without disturbing the position or interfering with the operation of the binder; and it will be drawn forward with the binder in a predetermined position which is suitable for coöperation of the parts of the binder and the shocker.

The shock former consists essentially of a casing of frusto-conical shape, said casing being adapted to receive a suitable number of sheaves and to arrange the same with the butt ends spread apart and with the head ends tilted in the direction of a common axis, thus presenting the conventional and most desirable form of shock. The shock former may be described as being composed essentially of a bottom member 43, a top member 44 and an end member or core 45. The bottom and top members together constitute the outer frusto-conical casing adjacent to the large end of and partly within which the conical bore 45 is supported when the casing is in bundle receiving position. It will, furthermore, be understood that the terms "bottom member" and "top member" which will be used throughout for convenience in designating the respective parts are strictly applicable in a descriptive sense only when the casing is in the bundle receiving position shown in full lines in Figs. 2, 18 and 19, it being evident that when the casing is tilted to a discharging position, as best seen in dotted lines in Fig. 19, the relative position of the members is changed, the top member being then positioned in front of the bottom member. The several casing members may be conveniently constructed of sheet metal and may be appropriately flanged and otherwise reinforced to provide the requisite strength and rigidity.

The frusto-conical casing of the shock former when in its normal bundle receiving position is placed with its large end that forms the base of the frustum toward the front, this being obviously preferable in order that the bundles may be transferred from the binder to the shocker casing without necessity for inverting the bundles. The large end of the top member 44 is securely connected with and supported by the bridge portion of a yoke 46, the limbs or side members of which are terminally pivoted at 47 on the side members 30 of the frame at the front end of the latter. The yoke 46 carries at the crest thereof a wheel 48 which is adapted to engage and to travel on the ground when the shock former is tilted to a discharging position, as seen in dotted lines in Fig. 19, said wheel serving to support the weight of the parts and to enable the machine to move unobstructedly in a forward direction. The bottom member 43 is hingedly connected with the top member 44 at the rear end or apex thereof, as seen at 49, the front end of said bottom member being supported in bundle receiving position by means of spring actuated latch members 50 that are pivotally connected with the limbs or side members of the yoke 46, as best seen in Fig. 20, said latch members serving to engage below beveled catch members 51 on the sides of the bottom member 43. It is obvious that the catch members 51 when engaged by the latch members 50 will serve to maintain the casing members 43 and 44 in closed relation; for the purpose of disengaging the spring latch members 50 from the catch members 51 at the proper time, lugs or brackets constituting trippers 52 are provided, said trippers being mounted on upright parts of the frame structure in the path of the latch members 52, so that when the shocker casing is tilted about the axis of the pivot members 47, the casing members will become disconnected at their large ends, the lower casing member being thus enabled to swing about the axis of the hinge members 49 to a non-obstructing position with respect to the shock, as seen in dotted lines in Fig. 19.

For the purpose of moving the casing member 43 to a non-obstructing position when the shock former has been tilted to the discharging position indicated in dotted lines in Fig. 19, means are provided including a lever B which is fulcrumed on one side of the upper casing member 44. One arm 53 of said lever which extends in a forward direction toward the large end of the shock former is suitably curved for coöperation with a roller 54 which is supported on the frame structure of the machine in the path of said lever arm. The other arm 55 of said lever carries a bell crank C, one arm of which, 56, is pivotally connected at 57 with an arm or bracket 58 that extends from the apex of the casing member 43; the other arm 59 of the bell crank C carries an adjustable weight 60 which may be maintained in adjusted position by means of a set screw 61, said weight being sufficiently heavy to overbalance the casing member 43 at the proper time. When the shock former is tilted from its initial bundle receiving position shown in full lines in Fig. 19 toward its discharging position indicated in dotted lines in said figure by the means provided for the purpose and which will be hereinafter more fully described, the spring actuated latch members 50 will be presently engaged by the trippers 52 disposed in the path thereof and will thereby be actuated to release the catch members 51, thereby disconnecting the large ends of the members of the shock former from each other. As the tilting movement advances and approaches its limit, the casing member 43 will be overbalanced by the weight 60 and will be thereby swung to the non-obstructing position indicated in Fig. 19, the casing member 44 being meanwhile supported in an upright position on the yoke 46, the supporting roller of which, 48, engages the ground. The movement beyond a predetermined point of the lever B carrying the bell crank C will be prevented by the arm 53, said lever contacting with the roller 54. When, by the means provided for the purpose, the return movement of the shock former is commenced, the lever 53 will be gradually restored by engagement with the roller 54 to its initial position, thus causing the casing member 43 to be moved by the joint action of said lever and the bell crank C to its closed relation with respect to its mate 44. As the closed casing of the shock former approaches its initial bundle receiving position, the impact of said casing will be received by a buffer consisting of a lever 62, one arm of which is disposed in the path of a projection 63 extending from the top member of the shock former, while the other arm of said lever is connected by a coiled spring 64 with one of the side members 30 of the frame structure. The shock former casing will thus be saved from any injury that might result from the shock of a sudden and violent impact.

The core member 45 is supported by an arm 65 that extends from an approximately vertical shaft or hinge rod 66 which is supported in bearings 67 on the frame structure. The shaft 66 carries at its lower end a gear segment 68 that meshes with a bevel gear segment 69 carried by a rock shaft 70. The shaft 70 has a radially extending arm 71 which is connected by a link 72 with one arm 73 of a lever fulcrumed at 74. The other arm 75 of said lever engages a projection 76 which is associated with the top member 44 of the shock former directly or by being placed on the yoke 46 carrying said member. It will be seen that when the lever fulcrumed at 74 is tilted by the means provided for the purpose and which will be presently described, it will tilt the shock former from its initial receiving position in the direction of a discharging position, the impact of said lever being relied upon to carry the shock former past a dead center, when it will gravitate to a discharging position. At the same time, the lever arm 73 serves to oscillate the rock shaft 70, thereby imparting oscillatory motion to the rod or shaft 66 having the core carrying arm, thereby swinging the core in a horizontal plane out of the way of the shock former which will thus be tilted without being obstructed by the core.

The top member 44 of the shock former has an inlet opening 77 for the sheaves or bundles coming from the binder, said inlet opening being partly surrounded by an elongated reinforcing frame 78. The lower edge of the opening 77, when the shock former is in receiving position, is disposed contiguous to the discharge end of the table 79 over which the sheaves or bundles pass from the binder table 80 to the shock former. The table 79, as clearly seen in Fig. 2, is curved or sigmoidal in cross section, said table being so constructed and proportioned that its discharge end will coincide with the inlet opening of the shock former, while its receiving end, when the shocker is assembled with the binder and harvester will project slightly beneath the binder table so as to receive the bundles discharged over the latter. A casing member 81 has been shown as being supported a suitable distance above the transfer table 79, coöperating with the latter to form a chute or passageway for the passage of the sheaves from the binder to the shock former.

For the purpose of conveying the sheaves over the table 79 arms or packers 82 are provided, said packers being mounted on a shaft 83 which is supported in an approximately horizontal plane and in approximately parallel relation to the outer wall of the shock former. Each packer consists of an arm, suitably curved and terminating in a sharp prong 84 adjacent to which ears 85 are formed between which a bracket 86 is pivotally mounted on a pin or pivot member 87 about which is coiled a spring 88 which terminally abuts on the prong 84 and the bracket 86, respectively, thereby forcing said bracket in an outward direction, where it is supported approximately at right angles to the prong 84 by means of a stud or stop member 89 formed on the underside of the bracket. The latter is obviously capable of yielding to pressure, whereby it may be caused to swing against the tension of the spring 88 in the direction of the prong 84. The table 79 is provided with slots 90 through which the packers will operate. The packers are actuated by mechanism to be presently described each time a bundle is discharged from the binder to convey such bundle to the shock former, after which said packers are restored to their initial position to await the coming of another bundle. To this end the supporting shaft 83 is mounted within the hollow of the upper curve of the sigmoidal table, while the packers, when in bundle receiving position, approximately conform in curvature to that of the lower curve of said sigmoidal table. The bundles when discharged from the binder by the ejector arms, shown at 91, will be received in the hollow of the lower curve of the table 79. When the shaft 83 carrying the packer arms oscillates in the proper direction, the packers will ascend through the slots 90, and the bundle will be impaled on the prongs 84, the brackets 86 serving to support the bundle while being carried upwardly over the table and through the slot 77 into the shock former, where the bundle will be pushed by the action of the brackets 86 to the proper position, after which the return movement of the oscillatory shaft 83 carries the packers back to the initial position approximately indicated in Fig. 2 of the drawings. It will here be noted that in the event of another bundle being somewhat prematurely discharged by the binder and reaching the table 79 slightly ahead of time, the spring actuated brackets 86 will brush by such bundle without being impeded thereby.

The packer shaft 83 is provided with a crank 92 which is connected by a link 93 with a slightly shorter crank 94 on a driven shaft 95, the rotation of which will thus impart the requisite oscillatory motion to the shaft 83. The shaft 95 carries a spur wheel 96 meshing with a pinion 97 on a shaft 98, said spur wheel and pinion being slightly beveled, as clearly seen in Fig. 1, as is rendered necessary owing to the fact that the shaft 95 and the packer shaft are disposed at an angle with respect to the shaft 98, the latter being positioned in a straight longitudinal line with respect to the machine. Said shaft 98 receives motion through intermeshing bevel gears 99 and 100 from a shaft 101, which latter receives constant motion when the machine is in operation from the ground wheel 102 with which is associated a band wheel or sprocket wheel 103 from which motion is transmitted by a band or link belt 104 to a counter shaft 105 from which motion is further transmitted by a belt or band 106 to the shaft 101, as will be best seen in Figs. 1 and 19.

The shaft 98 carries a clutch device which includes a casing 107 which is rigidly connected with the bevel gear 97 and which rotates with said bevel gear on the shaft 98. The clutch device further includes a slidable casing member 108 having associated therewith a conical core 109, the slidable casing member 108 being normally forced apart from the casing member 107 by the action of a spring 110 which is coiled about the shaft 98 and interposed between the core 109 and a ratchet wheel 111, which latter is fixedly mounted on the shaft. Pivoted interiorly on the casing member 107 is a dog 112 adapted to engage the ratchet wheel, said dog being supported on a rock shaft 113 which also carries a crank arm 114 provided with an anti-friction member, such as a roller 115, that normally engages the conical core 109. The arrangement is such that when the casing member 108 having the core 109 is projected outward from the casing member 107, and the anti-friction member 115 engages the core 109 near the apex of the latter, the dog 112 will be forced by an actuating spring 116 in engaging position with respect to the ratchet wheel 111; when, on the other hand, the casing member 108 is projected within the casing member 107, the action of the conical core 109 against the anti-friction member 115 will oscillate the rock shaft 113 against the pressure of the spring 116, thereby throwing the dog 112 out of engaging position with respect to the ratchet wheel 111. It is obvious that in the former position, that is to say, when the dog 112 engages the ratchet wheel 111, the latter, being fixed upon the constantly revolving shaft 98, will rotate the casing 107 together with the bevel pinion 97 which is connected therewith, thus transmitting motion through the spur wheel 96, the shaft 95 and related parts to the oscillatory packer shaft 83. It is obvious that a complete rotation of the shaft 95 carrying the spur wheel 96 is required in order that the packer shaft may complete its requisite movement. In order that the operation may be started and stopped at the proper intervals, trip mechanism is provided which will now be described.

The slidable clutch member 108 is provided with a hub 117 upon which is pivoted a latch member 118 adapted to engage a notch 119 in the frame member 120 which affords a bearing for the shaft 98. When the latch 118 engages the notch 119, as seen in Fig. 7, the clutch member 108 will be retracted within the casing member 107 against the pressure of the spring 110; when the latch 118 is disengaged from the notch 119, as seen in Fig. 8, the casing member 108 will be projected from the casing member 107. The latch 118, when in engagement with the notch 119, will be disposed in the path of a crank or trip arm 121 associated with a shaft 122 which receives motion by a belt or band 123 from the ejector shaft 124 of the binder, the arrangement being such that the latch 118 will be tripped by each rotation of the ejector shaft, or in other words, whenever a bundle is ejected. It will thus be evident that immediately upon the discharge of a bundle from the binder upon the table 79, the mechanism actuating the packer shaft will be started, and the bundle will be carried by the packers over the table 79 and to the shock former. The packers having accomplished their mission and having returned to their initial position, the operation is interrupted by means of a wedge 125, see Figs. 7, 8 and 9, carried by an arm 126 that extends from the spur wheel 96. The clutch casing member 108 is provided with an arm or bracket 127 extending from the hub thereof and carrying an anti-friction member 128, such as a roller, which is disposed in the path of the wedge 125 by the action of which the casing member 108 will be forced against the pressure of the spring 110 within the casing member 107 until the latch 118 gravitationally engages the notch 119 where it will be held, thus retaining the parts of the clutch in position for a repetition of the operation.

The shaft 101 which is constantly driven when the machine is in operation by motion transmitted from the ground wheel 102, carries two winding drums or cable drums 129, 130, one of which is utilized for tilting the shock former from its receiving position to its discharging position, the other drum 130 being utilized for restoring the shock former from its discharging to its receiving position. Connected with and adapted to wind upon the drum 129 is a cable 131 which is guided over suitably disposed guide members, such as pulleys 132, to the lever 73 with which it is connected. The cable 133 is directly connected with an arm 134 that extends from the shock former, see Fig. 13. Each of the drums 129 and 130 constitutes a clutch casing, as will be clearly seen by reference to Fig. 15 which shows a sectional view of the drum 130. The construction of these clutch casings and the clutch members associated therewith is identical to that of the hereinbefore described clutch device associated with the shaft 98 and which serves to actuate the packer shaft. Each of said clutch devices includes a slidably disposed conical clutch member 135, a ratchet wheel 136 which is fixed on the shaft 101, a spring 137 interposed between the ratchet wheel 136 and the conical member 135 to project the latter from the clutch casing constituting the drum, and a rock shaft 138 having a crank 139 carrying an anti-friction member 140 engaging and coöperating with the cone. The rock shaft in each drum casing also carries a spring actuated dog or pawl 141 adapted to engage the ratchet wheel 136. It will be understood that both drums 129 and 130 are normally loose upon and adapted to rotate about the axis of the shaft 101; this is possible because the shock former in its receiving as well as in its discharging position is firmly supported without straining or tensioning the cables 131, 133, said cables being under tension only while the shock former is being tilted from one position to the other. For the purpose of starting and stopping the respective drums 129, 130 at the proper times, means are provided as follows: The member 135 associated with the drum 129 has a hub 142 which is engaged by a shipping lever 143 fulcrumed at 144, the said shipping lever having a laterally projecting stud 145 which is disposed in the path of one arm of a spring actuated bell crank 146, the other arm of which is connected with one end of a pull member, such as a cord or rope 147, which extends to a convenient point within the reach of the operator who is seated on the machine. The shipping lever 143 is connected by a link or rod 148 with a crank arm 149 having a bevel segment 150 meshing with a similar bevel segment 151 on a crank arm 152 which is connected by a rod 153 with one arm, 154, of a bell crank, the other arm of which, 155, lies in the path of a shoe 156 that extends laterally from one limb of the carrying yoke 46 which supports the top section 44 of the shock former. It will be seen that when the operator pulls on the member 147 the bell crank 146 is tripped against the tension of its actuating spring 157, and one arm of said bell crank is moved out of the path of the stud 145 of the shipping lever 143. The clutch member 135 will now be forced by the pressure of the spring 137 outwardly with respect to the clutch casing that constitutes the drum; the anti-friction member 140 will move along the inclined wall of the cone 135 under the influence of the spring that actuates the dog 141, and the latter will pass into engagement with the ratchet wheel 136, whereby a rotary motion will be transmitted to the drum. The cable 131 being wound on the drum and placed under tension will pull on the lever 73 which will be quickly and forcibly tilted, throwing the shock former in the direction of its discharging position.

It will be understood that only a relatively short movement of the lever 73 is required, because it will serve to literally throw the shock former in the desired direction, and the movement of the shock former to its discharging position will be completed by gravity. As the shock former, which is mainly supported by the yoke 46, is tilted, the shoe 156 associated with said yoke will engage the arm 155 of the bell crank fulcrumed adjacent thereto, said arm being suitably spaced from the shoe 156 so that the contact will not take place until the tilting of the shock former is fairly under way. The other arm 154 of the bell crank through the intermediate connecting means will actuate the shipping lever 143 in the direction of the drum, thus causing the clutch member 135 to be forcibly retracted against the pressure of the spring 137 until the arm of the spring actuated bell crank 146 drops back to its initial position adjacent to and in the path of the stud 145, thus retaining the shipping lever and the clutch member in their initial position. It will be observed that the retracting movement of the clutch member 135 and the drum 129 will be performed positively, because the shoe 156 remains in contact with the bell crank arm 155 and forcibly presses thereagainst while this operation takes place and until the requisite movement is completed.

While the shock former is being tilted from its receiving to its discharging position, the cable 133 is being unwound from the drum 130. For the purpose of rewinding said cable on the drum and so restoring the shock former to its initial receiving position, a trigger 158 is provided, said trigger being pivotally mounted at 159. The trigger has one arm 160 which is connected with one end of a pull member, such as a rope or rod 161, the other end of which extends to a position within convenient reach of the operator. The trigger member has another arm 162 that extends in the path of a stop member 163 on the conical clutch member 135 associated with the drum 130. When the trigger arm 162 is moved out of the path of the stop member 163, the clutch member 135 is projected by the spring 137 with the result of starting the rotation of the drum 130, thereby winding the cable on said drum and exerting tension on the arm 134 which is effective in tilting or restoring the shock former to its initial receiving position. The stop member 163 carries an anti-friction member, such as a roller 164, which is presently engaged by a bevel or wedge-shaped projection 165 on the arm 134, which is effective in retracting or forcing the clutch member 135 within the drum casing against the pressure of the spring 137, thereby interrupting the rotation of the drum at exactly the proper time. A portion 166 of the frame structure which supports the drum carrying shaft 101 is disposed directly in the path of the wedge member 165, thereby assisting in supporting the shock former in its receiving position; violent contact of the wedge member 165 with the frame structure is prevented by the presence on the opposite side of the shock former of the shock absorbing device, including the lever 62 which has been heretofore described.

Supported in suitable guides 167 on the top member 44 of the shock former, see Fig. 21, is a binding needle 168 of arcuate shape which is adapted to move about and concentric with the axis of the shock former, the back of said needle being provided with a rack 169 meshing with a spur wheel 170 on a shaft 171 which is supported for rotation on the shock former. The shaft 171 carries a bevel pinion 172 meshing with a bevel pinion 173 on a shaft 174, likewise supported for rotation on the shock former and receiving motion by an endless belt or chain 175 from a shaft 176, also supported on the shock former. The shaft 176 carries a spur wheel 177 meshing with a rack segment 178 which is supported on the frame structure of the machine in concentric relation to the pivot member 47 that connects the yoke 46 with said frame structure. It follows that when the shock former is tilted, the spur wheel 177 will be rotated and motion will be transmitted to the spur wheel 170 which in turn serves to move the needle in one direction or the other, the direction being, of course, governed by the direction in which the shock former is tilted. The shock former supports a twine box 179 from which the twine 180 is guided through the eye 181 of the needle and to a holder 182 associated with the knot tying mechanism. The latter includes the knotter shaft 183 having a bevel gear 184 meshing with a corresponding bevel gear 185 on a shaft 186 supported by a bracket 187 on the shock former and on which a spur wheel or pinion 188 is mounted for rotation, said spur wheel 188 and bevel gear 185 being provided with interengaging clutch teeth 189, and said spur wheel being forced in the direction of the bevel gear by means of a spring 190, as best seen in Fig. 22. The spur wheel or pinion 188 may be driven in any convenient manner from some moving part of the machine or of the binder with which the machine is associated for operation.

The ground wheel 102 of the machine is preferably mounted on a slide 191 for the support of which guides 192 are provided, as seen in Fig. 1. Means are also to be provided for effecting adjustment of the slide in order to regulate the height of the frame above the ground, but as such means are well known it has been deemed unnecessary to make specific illustration thereof.

When in operation, the improved shock former is attached to a grain binder and travels along the field, the sheaves or bundles ejected from the binder will be received on the transfer table 79. As each bundle is ejected from the binder, the trip mechanism of the packer shaft 83 is actuated, and the latter will be oscillated by the mechanism provided for the purpose with the effect of carrying the bundle over the transmission table and through the opening 77 of the shock former where it is received in the bight of the binding twine, the oscillatory movement of the packer shaft serving to restore the packer arms to their initial position. A repetition of the operation will convey another bundle to the shock former, and the operation will be repeated until the requisite number of sheaves have been placed therein. It will be understood that the first sheaf is retained in the bight of the binder twine and that it will thus be carried around the circumference of the core member 45, each successive sheaf or bundle being forcibly pushed by the packers into the shock former. When the requisite number of sheaves have been placed in the shock former, the operator by pulling the member 147 will trip the bell crank 146, causing the drum 129 to rotate and to wind the cable 131 whereby the shock former is thrown or moved through the action of the intermediate mechanism from a receiving to a discharging position. When the shock former is tilted, the needle is moved or projected across the aperture 77, and the knot is tied by the mechanism provided for the purpose which is of conventional construction and the operation of which is well understood. The knotting mechanism obviously includes the customary knife or cutter whereby the binding twine is severed. As the shock former reaches its discharging position, in which the bottom member 43 is thrown to the non-obstructing position indicated in Fig. 19, the shock is deposited on the ground and left behind, while the machine advances. This entire operation occupies but very little time, owing particularly to the fact that the shock former is not gradually pulled from its receiving to its discharging position, but is literally kicked or thrown by the action of the lever 73. As soon as the shock is clear of the former, the operator by pulling the member 161 starts into operation the drum 130, whereby the shock former is restored to its initial receiving position, it being understood that the spur wheel 188 will rotate idly on the shaft 186 during the return movement, so that the position of the parts constituting the knotting device will remain unchanged during the return movement of the shock former.

It will be seen from the foregoing description that I have provided a shock forming device of simple construction which by actual test has proven efficient in operation and one which may be built at a moderate expense and which is capable of being successfully used in connection with various conventional types of grain binders. It will also be seen that no change in the mechanism of the grain binder is required in order to operate in connection with the improved shocker.

Having thus described the invention, what is claimed as new, is:—

1. In a shock former, a carrying frame, a tiltable yoke pivoted thereon, a casing member rigidly connected with the yoke, a second casing member hingedly connected with the first casing member, and means for swinging the second casing member to a non-obstructing position with respect to the contents of the casing when the yoke is tilted, said means including a movable supported bell crank, a weight adjustable on one arm of said bell crank, and an arm extending from the second casing member with which the other arm of the bell crank is pivotally connected.

2. In a shock former, a carrying frame, a tiltable yoke, a casing member carried by said yoke, a second casing member hingedly connected with the first casing member and having a projecting arm, a lever fulcrumed on the first casing member, a bell crank fulcrumed on one arm of the lever, and a weight on one arm of the bell crank, the other arm of the bell crank being pivotally connected with the arm projecting from the second casing member.

3. In a shock former, a carrying frame, a tiltable yoke, a casing member rigidly connected with said yoke, a second casing member hingedly connected with the first casing member and having a projecting arm, and means for actuating the second casing member, said means including a lever fulcrumed on the first casing member, a roller supported on the first casing member, a roller supported in the path of one arm of said lever, a bell crank fulcrumed on the other arm of the lever, and a weight adjustable on one arm of the bell crank, the other arm of said bell crank being pivotally connected with the arm of the second casing member.

4. In a shock forming device, a carrying frame, a tiltable yoke pivoted thereon, a shock former comprising two hingedly connected members, one of which is rigidly connected with the yoke, latch means for connecting the casing members in closed relation, releasing means for said latch means, and actuating means for the casing member which is not rigidly connected with the yoke, said actuating means including a lever fulcrumed on the rigidly supported casing member, a contact member mounted on the supporting frame in the path of one arm of said lever, a bell crank fulcrumed on the other arm of the lever, a weight adjustable on one arm of said bell crank, and pivotal connecting means between the other arm of the bell crank and the movably supported casing member.

5. In a shock forming device, a frustoconical former casing longitudially divided and comprising two members hingedly connected at the apex thereof, a tiltably supported yoke with which one casing member is rigidly connected, latch means for maintaining the casing members in closed relation, a conical core member movably supported within the base portion of the frustoconical casing and a supporting arm for said core mounted pivotally outside and adjacent to the casing.

6. In a shock forming device, a frustoconical former casing longitudinally divided and comprising two members hingedly connected at the apex thereof, a tiltably supported yoke with which one casing member is rigidly connected, latch means for maintaining the casing members in closed relation, a conical core member movably supported within the base portion of the frustoconical casing, a supporting arm for said core mounted pivotally outside of and adjacent to the casing, and actuating means for said arm.

7. In a shock former, a carrying frame, a tiltable yoke pivoted thereon, a frusto-conical casing comprising a top member rigidly connected with the yoke and a bottom member hingedly connected with the top member at the apex thereof, latch means for maintaining the casing members in closed relation, means for supporting the frustoconical casing in receiving position with its axis in approximately horizontal position, the top member of the casing being provided with a bundle inlet, an arm supported for swinging movement in an approximately horizontal plane, a conical core member carried by said arm and projecting within the base of the casing when the latter is in receiving position, means for simultaneously swinging the former casing to a discharging position and the core carrying arm to a non-obstructing position, and means for moving the bottom member to a non-obstructing position with respect to the contents of the casing.

8. In a shock former, a frusto-conical casing comprising hingedly connected top and bottom members, the top member having a bundle inlet, a carrying frame, a yoke tiltably pivoted on the carrying frame and with the bridge portion of which the top member of the casing is rigidly connected, latch means for maintaining the casing members in closed relation, and tilting means including a stud associated with the casing, a lever having an arm engaging said stud, and means for forcibly actuating the lever to throw the casing in the direction of its discharging position.

9. In a shock forming device, a carrying frame, a tiltable yoke pivoted thereon, a frusto-conical casing comprising a top member rigidly connected with the yoke and a bottom member hingedly connected with the top member, said top member having a bundle inlet, latch means for maintaining the casing members in closed relation, a shaft supported for rotation and having an arm, a conical core member supported on said arm and adapted to swing toward and away from the base portion of the casing, a tilting means including a contact member associated with the casing, a lever supported on the frame structure and having an arm in the path of which said contact member is disposed, means for forcibly actuating the lever, and means for transmitting motion to the shaft having the core carrying arm.

10. In a shock former, a frusto-conical casing comprising hingedly connected top and bottom members, tiltable supporting means for the top member, latch means to connect the members in closed relation and trip means for said latch means, means for forcibly tilting the casing from its receiving position in the direction of its discharging position, said means including a push lever, a cable drum, a suitably guided cable connecting the drum with the lever, a constantly rotating shaft supporting the drum, and normally inactive clutch means to connect the drum with the shaft, manually operable clutch tripping means actuating the clutch to connect the drum operatively with the shaft, and means for restoring the clutch mechanism to its normal inactive condition, said means including a shoe associated with the tiltable supporting means, and a trip lever having an arm extending in the path of said shoe.

11. In a device of the character described, a carrying frame, a tiltable yoke connected therewith, a shock forming casing carried by the tiltable yoke and having a laterally extending stud, a lever having an arm to engage said stud when the casing is tilted to a receiving position, and means for actuating the lever to toss the casing from a receiving in the direction of a discharging position.

12. In a device of the character described, a carrying frame, a tiltable yoke connected therewith, a shock forming casing supported by the tiltable yoke and having a lateral inlet, a cone-shaped core member constituting a spreader for the contents of the casing, means for movably supporting said core member in axial relation to the casing, and means for swinging said core member to a position exterior of the casing.

13. In a device of the character described, a carrying frame, a tiltable yoke hingedly connected therewith for movement in a vertical plane, a shock former consisting of a casing of frusto-conical shape; said casing being composed of a top member directly connected with the bridge portion of the yoke and having a lateral inlet and a bottom member hingedly connected with the top member, means for tossing the casing from a receiving in the direction of a discharging position, counterbalancing means for the hingedly supported casing member, an arm supported for movement in a horizontal plane, a conical core member carried by said arm and positioned within the casing when the latter is in receiving position, and means for actuating the arm to move the core out of the path of the casing when the latter is tossed in the direction of its discharging position.

14. In a device of the character described, a frusto-conical shock former having a lateral inlet, an arm supported pivotally outside of and adjacent to the casing, and a conical core carried by said arm and capable of swinging to an axial position with respect to the casing to constitute a spreader.

15. In a device of the character described, a tiltable yoke, a frusto-conical shock former supported thereby and having a lateral inlet, said shock former being composed of two members one of which is movably supported with reference to the other member, and a shock absorber comprising a lever and a spring engaging one arm of said lever, the other arm being disposed in the path of the shock former to receive the impact thereof and to support the same when tilted from a discharging to a receiving position.

16. The combination with a grain binder, of a shock forming device comprising a carrying frame, a tiltable yoke connected therewith, a frusto-conical casing supported by the yoke and comprising a plurality of movably connected members, one of which has a lateral inlet, a slotted table supported adjacent to the inlet of the casing to receive bundles discharged from the binder, a rock shaft having packer arms operating through the table, said arms being provided with pivotally supported spring actuated bundle engaging bracket members, means including a constantly driven shaft and a clutch device for intermittently actuating the packer carrying rock shaft, and clutch tripping means actuated by power derived from the ejector shaft of the binder.

17. In a shock former, a tiltably supported frusto-conical casing having a lateral inlet, a transfer table supported adjacent to the inlet, a packer operating through the transfer table and having a pivoted spring actuated bundle engaging bracket member, means for actuating the packer, shock binding means including a needle supported to traverse the inlet of the casing and a knot tying device supported adjacent to said inlet, and needle actuating means supported in the path of the tiltable casing to actuate the binding means when the casing is tilted.

18. The combination with a grain binder, of a shock forming device including a tiltably supported frusto-conical casing comprising a plurality of movably connected members, one of which has a lateral inlet and one of said members constituting a butt spreading core, a transfer table supported adjacent to the inlet, a shock binding device including a needle supported to traverse the inlet and a knot tying device, twine supplying means, and means for positively conveying bundles of grain over the transfer table and through the inlet into the casing to be there supported by the bight of the binding twine in unobstructing position with relation to the inlet.

19. In a device of the class described, a carrying frame, a tiltably supported yoke hingedly connected therewith, a frusto-conical casing having a lateral inlet and a laterally extending stud, means for tilting the casing from receiving to discharging position including a lever engaging the laterally extending stud, a flexible element connected with the lever and a winding drum with which said flexible element is connected, means for interrupting the rotation of the winding drum immediately following the actuation of the lever, and means for returning the casing from discharging to receiving position including a flexible element connected with the casing and with the drum with which said flexible element is connected.

20. The combination with a grain binder, of a shock forming device including a tiltably supported frusto-conical casing having a lateral inlet, a transfer table of sigmoidal shape having one end supported adjacent to the inlet of the casing and the other end supported adjacent to the binder deck, a revolving ejector shaft associated with the binder, a rock shaft supported below the transfer table adjacent to the discharge end of the latter and concentrically within the hollow thereof, packers associated with the rock shaft and operating through the transfer table, said packers consisting of curved arms each terminating in a sharp prong and each having a spring actuated bracket pivoted adjacent to said prong and provided with a lug to limit its outward movement, and means for imparting to the rock shaft an oscillation simultaneously with each complete revolution of the ejector shaft.

21. In a device of the class described, a carrying frame, a frusto-conical casing tiltably connected therewith and having a lateral inlet and a laterally extending stud, shock binding means including a needle guided on the casing in a path concentric with the axis thereof, knot tying means and a twine supply, means for engaging and actuating the needle while the casing is being tilted, means for tilting the casing from receiving to discharging position including a lever engaging the laterally extending stud, a flexible element connected with the lever, a winding drum with which the flexible element is connected, and means for actuating the winding drum; and means for returning the casing from discharging to receiving position including a flexible element connected with the casing, a winding drum with which the flexible element is connected, and means for actuating the winding drum; the knot tying means including clutch means whereby it is rendered inactive while the casing is being restored from discharging to a receiving position.

22. In a device of the class described, a tiltable frusto-conical casing comprising movably connected members, one of said members having a lateral inlet, means for supporting the casing from receiving to discharging position including a lever operating to push the casing in the desired direction, a flexible element connected with the lever, and a winding drum with which said flexible element is connected; means for returning the casing from discharging to receiving position including a flexible element connected with the casing, and a winding drum with which said flexible element is connected; said winding drums being supported on a constantly rotating shaft; clutch means to connect the drums with the shaft, trip means to throw the clutch means into action, and means for automatically interrupting the operation of the clutch means.

23. In a device of the class described, a carrying frame, a tiltable yoke hingedly connected therewith, a frusto-conical casing including a top member connected with said yoke and having a lateral inlet and a laterally extending stud, and a bottom member hingedly connected with the top member, means for tilting the casing from receiving to discharging position including a lever engaging the laterally extending stud, a flexible element connected with the lever, and a winding drum with which said flexible element is connected, means for returning the casing from discharging to receiving position including a flexible element connected with the casing and a winding drum with which said flexible element is connected, means for introducing bundles of grain into the casing, means including a clutch for operating the first mentioned winding drum, means for automatically stopping the operation of said first mentioned winding drum when the tilting casing has been started from its receiving position in the direction of its discharging position, means including a clutch for operating the second winding drum, and means for automatically interrupting the operation of said second winding drum when the casing is restored to receiving position, and a constantly driven shaft on which the winding drums are loosely mounted to permit a flexible element to be unwound from one drum while the other flexible element is being forcibly wound on the other drum.

In testimony whereof I affix my signature in presence of two witnesses.

FALTINE NEWBAUER.

Witnesses:
M. J. ENGLERT,
J. J. ENGEU.